(12) United States Patent
Willard

(10) Patent No.: US 7,064,260 B2
(45) Date of Patent: Jun. 20, 2006

(54) STRINGED INSTRUMENT FINGER TRAINING DEVICE

(76) Inventor: John Willard, P.O. Box 2269, Gig Harbor, WA (US) 98335

(*) Notice: Subject to any disclaimer, the term of this patent is extended or adjusted under 35 U.S.C. 154(b) by 12 days.

(21) Appl. No.: 10/892,725

(22) Filed: Jul. 16, 2004

(65) Prior Publication Data
US 2005/0039592 A1    Feb. 24, 2005

Related U.S. Application Data

(60) Provisional application No. 60/496,874, filed on Aug. 20, 2003.

(51) Int. Cl.
*G09B 15/06* (2006.01)
(52) U.S. Cl. .......................... 84/465; 84/453
(58) Field of Classification Search ................. 84/465, 84/453
See application file for complete search history.

(56) References Cited

U.S. PATENT DOCUMENTS 4,065,995 A * 1/1978 Greer .......................... 84/465
4,505,178 A * 3/1985 Redman ....................... 84/465

FOREIGN PATENT DOCUMENTS

JP    2003216019 A * 7/2003

* cited by examiner

*Primary Examiner*—Marlon T. Fletcher
*Assistant Examiner*—Jianchun Qin
(74) *Attorney, Agent, or Firm*—Dean A. Craine

(57) ABSTRACT

A small, portable device used to exercise and train the fingers of a stringed instrument player. The device is a rigid, short neck body, u-shaped in cross-section and designed to simulate a short section of the neck of a stringed instrument, such as a guitar. The neck body is hollow with an elongated main cavity with two or more, transversely aligned finger bars located thereover. Each finger bar is mounted on two or more coil springs enabling it to move up and down on the neck body. The top of each finger bar is flat and includes four to six raised string lines that represent strings on a stringed instrument. The main cavity is divided into a plurality of finger bar cavities by a plurality of support ribs. When at rest, the top surfaces of the finger bars are elevated above the support ribs and represent frets on the neck body.

6 Claims, 4 Drawing Sheets

STRINGED INSTRUMENT FINGER TRAINING DEVICE

This utility patent application is based on the provisional patent application (Ser. No. 60/496,874) filed on Aug. 20, 2003.

BACKGROUND OF THE INVENTION

1. Field of the Invention

This invention relates generally to the field of musical instruments and, more particularly, to finger training devices for stringed musical instruments.

2. Description of the Related Art

Skilled guitarists must quickly form a large variety of chords on a guitar neck. This requires not only that the guitarist's fingers be properly aligned over the correct strings and between frets, but also that an adequate amount of pressure be applied to the strings. When forming some chords, the thumb must be pressed firmly against the back surface of the neck and the other four fingers must be position correctly over the strings. In order to press the strings against the frets, adequate downward pressure must be exerted against the strings. The primary purpose of practicing, of course, is to train the fingers to quickly and accurately move over the strings to form different chords with sufficient pressure exerted against the strings. Unfortunately, it may take several years of practice to master this skill.

What is needed is a training device that simulates the neck of a stringed instrument, such as a guitar, that allows the user to practice forming different chords on the neck with adequate string pressure.

SUMMARY OF THE INVENTION

The above object is met by a small, portable device disclosed herein used to exercise and train the fingers to quickly move to different locations on the neck of a stringed instrument, such as guitar to form different chords, and exert sufficient string pressure. The device comprises a rigid, short neck-simulating body that simulates a short section of the neck of a guitar. The body is rigid structure substantially u-shaped in cross-section with a main cavity and a top opening. Extending transversely on the body are a plurality of support ribs that divide the main cavity into a plurality of finger bar cavities. The support ribs are sufficiently spaced apart to accurately represent the spacing between frets on a guitar.

Formed inside the neck body are two or more transversely-aligned finger bars. In the preferred embodiment, the finger bars are located in the space between adjacent support ribs. Each finger bar is suspended and supported over the body by a biasing means. Formed transversely and evenly spaced apart on each finger bar are four to six raised string lines that represent strings that extend longitudinally over the guitar's neck.

During use, the device is held in one hand with the thumb placed under the neck and the other fingers wrapped around the neck so that the finger tips are properly positioned over the appropriate notes to form a chord. The user uses the finger to force the fingers bars downward so that the top surfaces of the fingers bars are even or flush with the top surface of the adjacent support ribs. When the user detects the top surfaces of the adjacent support ribs, he or she knows that adequate pressure has been exerted by the fingers on the finger bars to play the desired chord.

DESCRIPTION OF THE PREFERRED EMBODIMENT(S)

Figure 1:
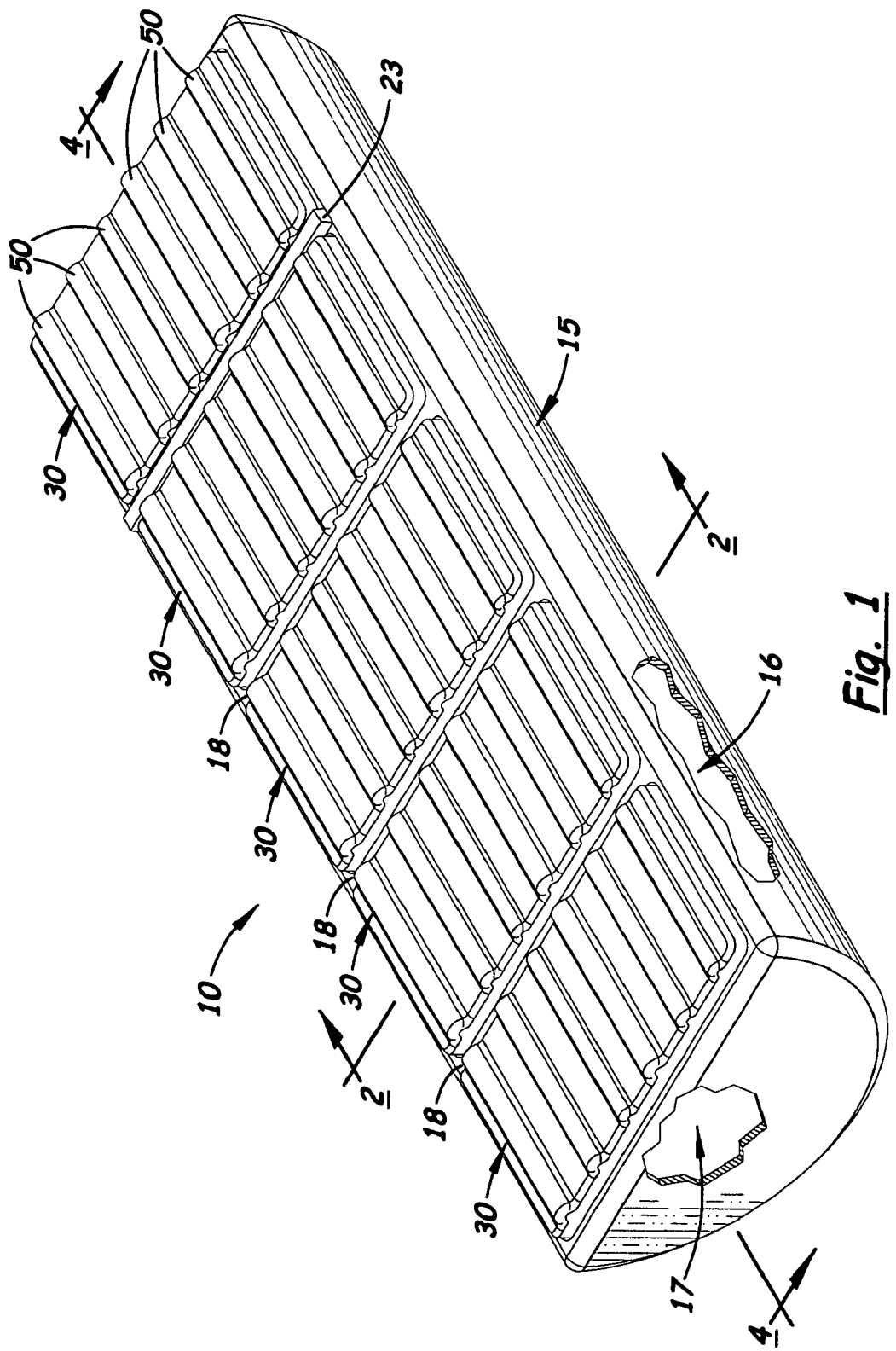
FIG. 1 is a perspective view of the stringed instrument finger training device.

Referring to the FIGS. 1–4, there is shown a small, portable device, generally referenced as 10, used to exercise and train the fingers to play a stringed instrument, such as a violin or guitar. The device 10 comprises a rigid, u-shaped, hollow neck body 15 designed to simulate a short section of the neck of a stringed instrument. Formed inside of the neck body 15 is an elongated main cavity 16 that is divided into a plurality of finger bar cavities 17 by support ribs 18. Disposed over each finger bar cavity 17 is a movable finger bar 30.

Figure 2:
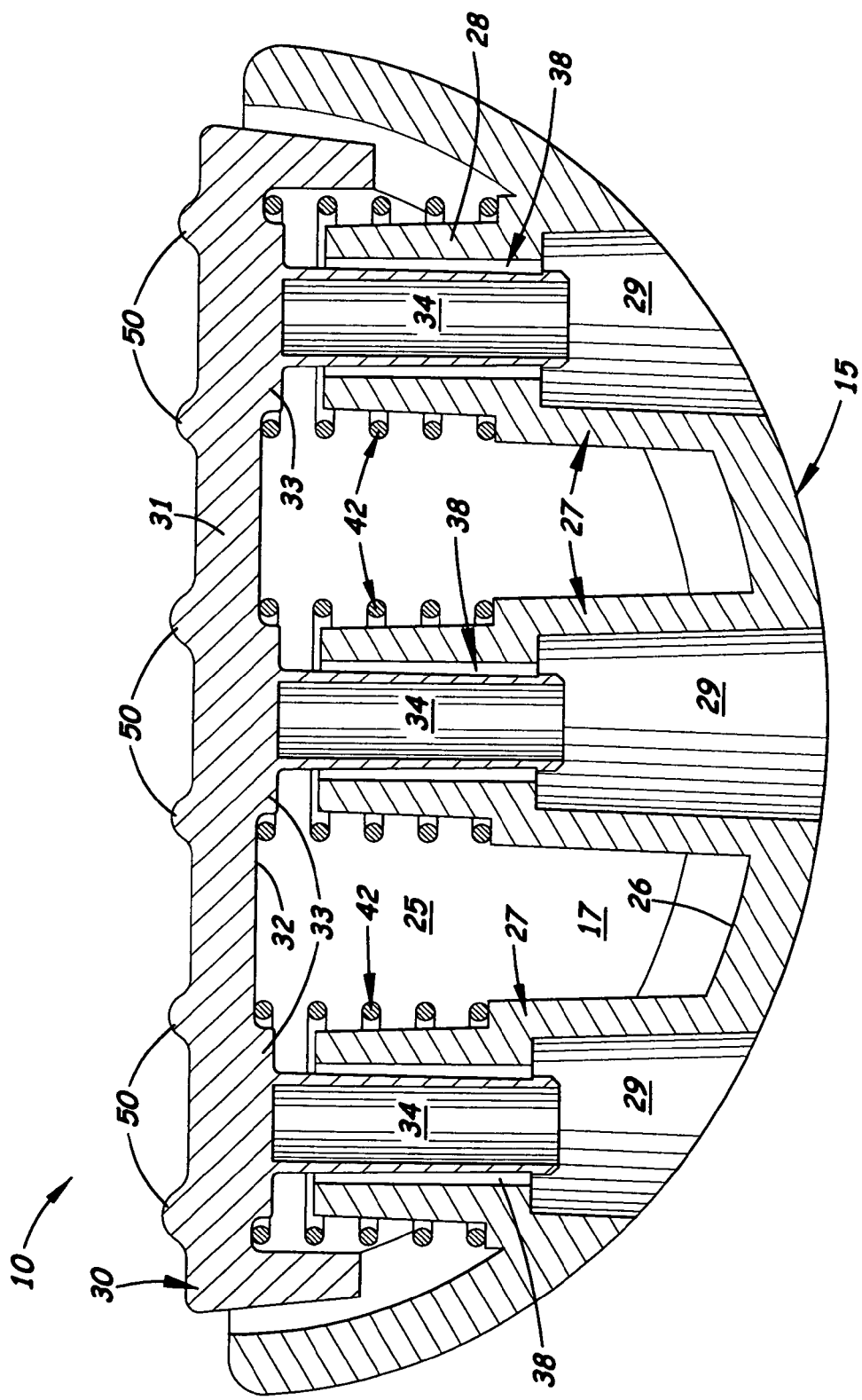
FIG. 2 is a sectional, side elevational view of the device taken along line 2—2 in FIG. 1.
Figure 4:
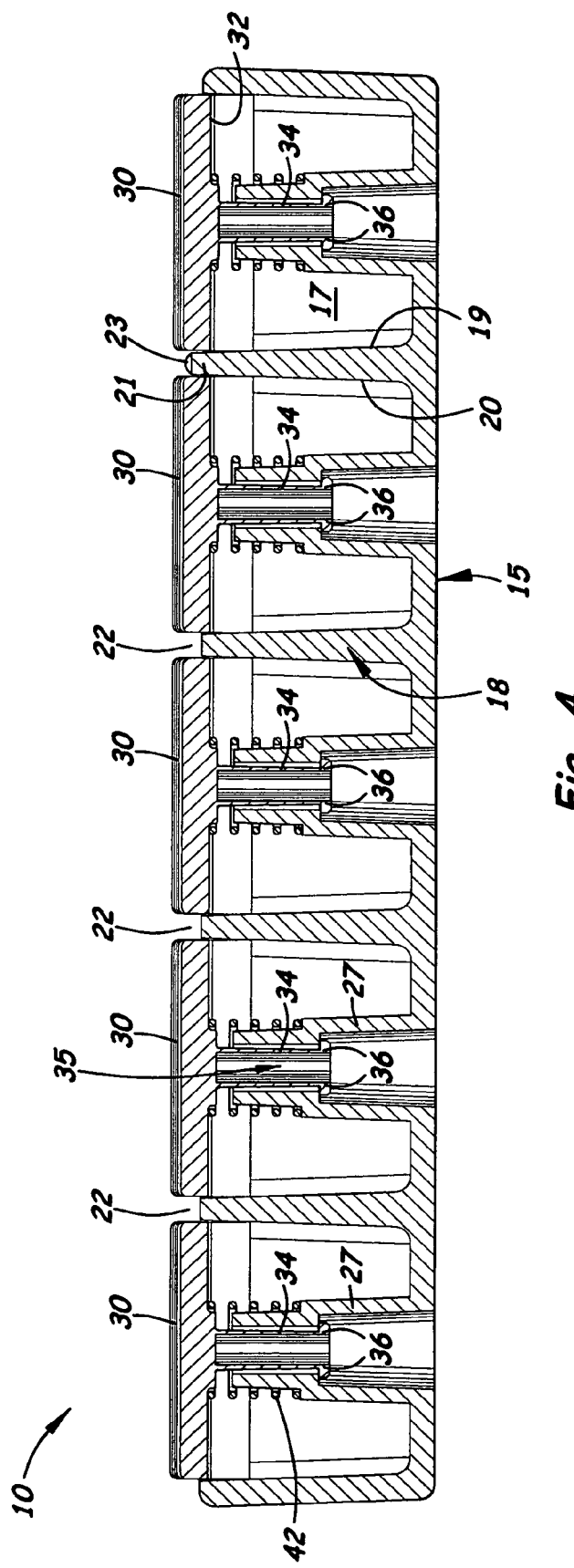
FIG. 4 is a sectional, side elevational view of the device taken along line 4—4 in FIG. 1.

The support ribs 18 are integrally formed on the neck body 15 and include two inside surfaces 19, 20 and a top surface 21. Each finger bar 30 is suspended over the finger bar cavity 17 by a biasing means that forcibly holds the finger bar 30 in an upward, suspended position inside the finger bar cavity 17 as shown in FIGS. 2 and 4. In the preferred embodiment, the biasing means forces the finger bar 30 upward so that its top surface 31 elevated approximately ⅛ inch above the top surface 21 of the support rib 18. When forced downward, the finger bar 30 is pressed into the finger bar cavity 17 so that the top surface 31 of the finger bar 30 is aligned with the top surface 21 of the support rib 18.

Formed transversely on the top surface 31 of each finger bar 30 are four to six string lines 50 that represent strings that extend longitudinally over the neck of an instrument. As stated above, in the preferred embodiment, the finger bars 30 extend slightly above the top surface 21 of the support rib 18 thereby forming transversely aligned slots 22 between adjacent finger bars 30. During use, the slots 22 are detectable and represent frets typically found on a stringed instrument. As an optional feature, a raised fret surface 23 may be formed on the top surface 21 of each support rib 18 that more accurately represents a fret.

In the preferred embodiment, the biasing means includes at least two springs 42 (three springs 42 shown in FIG. 2) disposed between the inside surface 26 of each finger bar cavity 17 and the bottom surface 32 of the finger bar 30. Formed on the inside surface 26 are at least two equally spaced apart posts 27 that extend upward and receive a coil spring 42. Each post 27 includes an upper narrow neck 28, a lower wide neck 29, and a center bore 38.

Formed on the bottom surface 32 of the finger bar 30 is a short neck platform 33 with a downward extending post 34. As shown in FIG. 4, each post 34 includes a longitudinally aligned slot 35 and a lower, circular outward extending lip 36. During assembly, posts 27 and 34 are longitudinally aligned so that the post 34 slides into a center bore 38 formed on the posts 27. The circular outward extending lip 36 engages the inside surface of the post 27 thereby connecting the finger bar 30 to the body 15. During use, the coil spring 42 is longitudinally aligned over the two posts 27, 34 and between the lower wide neck 29 and short neck platform 33.

The coil spring 42 forces the finger bar 30 upward inside the finger bar cavity 17. The coil spring 42 is sufficient in length to press against the bottom surface 32 of the finger bar 30 when the finger bar 30 is positioned over the cavity 17. The lips 36 prevent the finger bar 30 from disengaging completely from the body 15. In the preferred embodiment, the finger bars 30 are biased upward approximately ⅛ inch above the posts 27. When the short neck platform 33 presses against the narrow neck 28, the finger bar 30 is prevented from being pressed further into the cavity 17.

Figure 3:
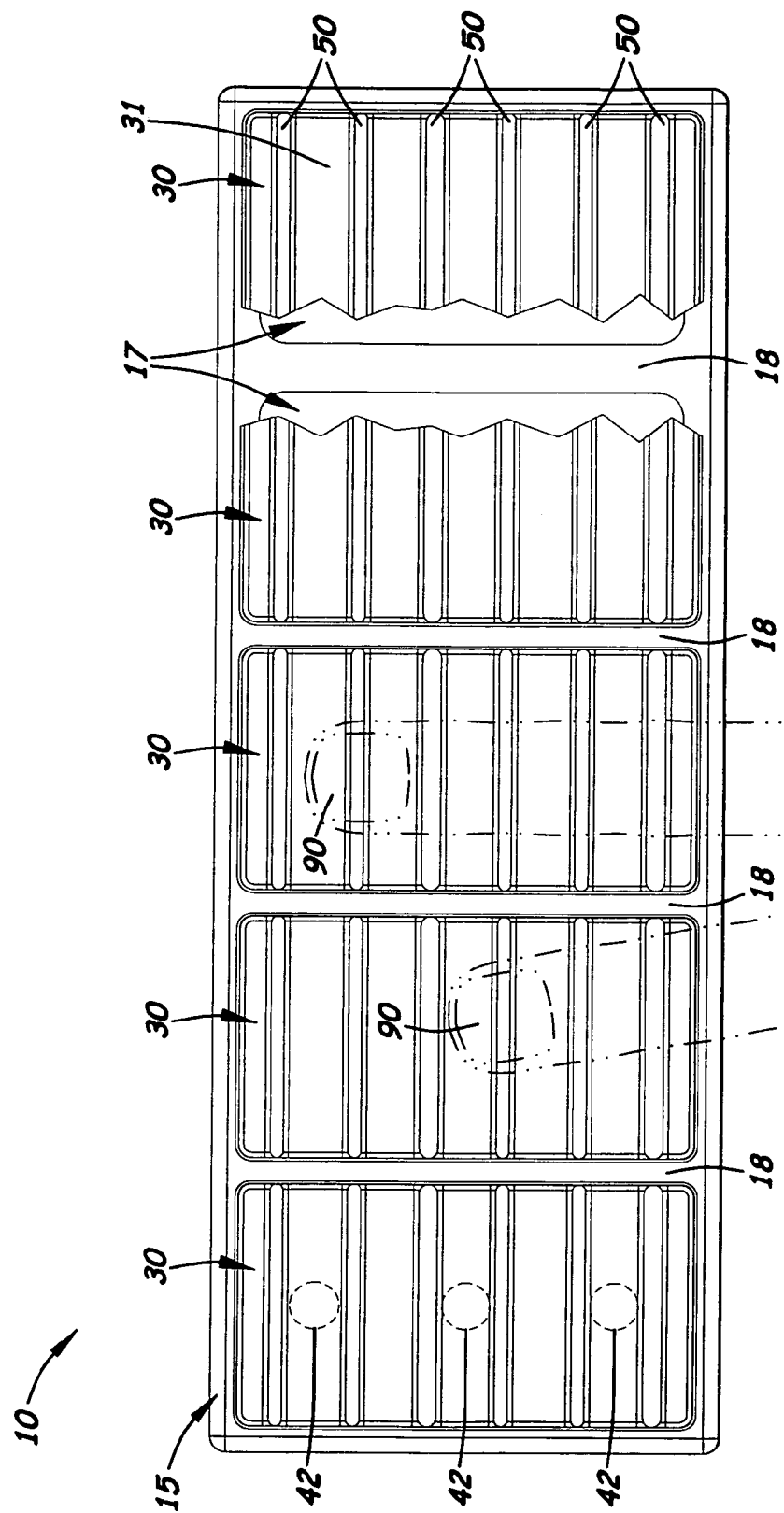
FIG. 3 is a top, plan view of the device showing two fingers being trained.

As shown in FIG. 3, during use the user's thumb (not shown) is placed against the back surface of the neck body 15 and the fingers 90 are placed over the finger bars 30 with the finger tips positioned over the desired string line 50. After all of the fingers 90 have been properly positioned, the thumb and fingers 90 are squeezed together until the top surfaces 31 on the finger bars 30 are forced downward and aligned with the top surface 21 of the support ribs 18. The springs 42 provides sufficient upward pressure on the finger bars 30 to accurately represent the required amount of finger pressure needed to play the chord. The user then quickly releases the pressure and moves the fingers to play additional chords.

In the preferred embodiment, the body 15 measures approximately 5½ inches in length, 2 inches in width, and ¾ inches in depth long its center longitudinal axis. The posts 27 and 34 each measure approximately ¾ and ½ inches, respectively, in length. In the preferred embodiment, the body 15 and fingers 30 are made of molded plastic.

In compliance with the statute, the invention described herein has been described in language more or less specific as to structural features. It should be understood, however, that the invention is not limited to the specific features shown, since the means and construction shown is comprised only of the preferred embodiments for putting the invention into effect. The invention is therefore claimed in any of its forms or modifications within the legitimate and valid scope of the amended claims, appropriately interpreted in accordance with the doctrine of equivalents.

I claim:

1. A finger pressure exercising apparatus, comprising:
   a. a rigid neck body that simulates a short section of a neck on a stringed instrument, said neck body including a plurality of transversely aligned, adjacent cavities, each said cavity including a top opening and an inside surface, said neck body including a longitudinal axis;
   b. a plurality of retractable finger buttons transversely aligned and mounted over said cavities, on said neck body, one said finger button being transversely aligned over one said cavity, and capable of moving between an extended position and a retracted position over said cavity, each said finger button including a plurality of elevated, string lines transversely aligned and evenly spaced apart over the top surface of said finger button, said string lines are parallel with said longitudinal axis of said neck body;
   c. means to align one said finger button over one said cavity, said means to align said finger button over said cavity including at least one upward extending post located inside each said cavity and connected to said inside surface of said neck body, and at least one downward extending posts formed on said bottom surface of said finger button, said upward extending and downward extending posts capable of being longitudinally aligned and slidingly connected together to aligned said finger button over said cavity, and;
   d. a biasing means for independently supporting one said finger button over one said cavity, said biasing means capable of applying sufficient upward force on said finger button to force said finger button in an extended position over said cavity yet allow said finger button to be pressed inward and retracted in said cavity, said biasing means being used to apply upward force on said finger button sufficient to simulate the amount of force needed to be exerted by a finger on a string to adequately press a string against the top surface of a string instrument when playing the instrument.

2. The finger pressure exercise apparatus, as recited in claim 1, wherein said biasing means is a coil spring disposed inside said cavity.

3. The finger pressure exercise apparatus, as recited in claim 1, further including a transversely aligned rib formed on said top surface on said body and between adjacent said finger buttons.

4. The finger pressure exercise apparatus, as recited in claim 3, further including a raised fret surface formed on each said rib.

5. The finger pressure exercise apparatus, as recited in claim 1, further including a transversely aligned rib formed on said top surface on said neck body and between adjacent said cavities.

6. The finger pressure exercise apparatus, as recited in claim 5, further including a raised fret surface formed on each said rib.

* * * * *